(12) United States Patent
Dieckmann et al.

(10) Patent No.: US 6,501,376 B2
(45) Date of Patent: Dec. 31, 2002

(54) METHOD AND APPARATUS FOR DATA EXCHANGE BETWEEN TOWING VEHICLE AND TRAILER

(75) Inventors: Thomas Dieckmann, Pattensen (DE); Arne Michaelsen, Hannover (DE)

(73) Assignee: WABCO GmbH & Co. OHG, Hannover (DE)

( * ) Notice: Subject to any disclaimer, the term of this patent is extended or adjusted under 35 U.S.C. 154(b) by 0 days.

(21) Appl. No.: 09/922,625

(22) Filed: Aug. 6, 2001

(65) Prior Publication Data

US 2002/0030590 A1 Mar. 14, 2002

(30) Foreign Application Priority Data

Sep. 6, 2000 (DE) .......................................... 100 44 034

(51) Int. Cl.$^7$ ................................................. B60Q 1/44
(52) U.S. Cl. ...................... 340/479; 340/475; 340/538; 340/815.4; 340/425.5; 340/426; 340/431; 303/122.02; 303/122.05; 303/123; 303/124
(58) Field of Search ................................ 340/479, 475, 340/538, 815.4, 425.5, 426, 431; 303/122.02, 122.05, 123, 124

(56) References Cited

U.S. PATENT DOCUMENTS

| | | | |
|---|---|---|---|
| 4,582,280 A | | 4/1986 | Nichols et al. ......... 246/182 R |
| 4,952,908 A | * | 8/1990 | Sanner ..................... 340/429 |
| 5,025,253 A | * | 6/1991 | DiLullo et al. ......... 340/825.06 |
| 5,142,278 A | | 8/1992 | Moallemi et al. ...... 340/825.06 |
| 5,397,924 A | * | 3/1995 | Gee et al. .................. 307/9.1 |
| 5,442,810 A | * | 8/1995 | Jenquin ..................... 455/66 |
| 5,666,103 A | * | 9/1997 | Davis, Jr. ................ 340/479 |
| 5,739,592 A | * | 4/1998 | Rigsby et al. ............ 307/901 |
| 5,831,519 A | | 11/1998 | Pedersen et al. ......... 340/425.5 |

FOREIGN PATENT DOCUMENTS

| | | | |
|---|---|---|---|
| DE | 41 11 223 A1 | 10/1992 | |
| DE | 690 24 056 T2 | 10/1996 | |
| DE | 196 47 461 C2 | 5/2000 | |
| EP | 0 950 565 A1 | 10/1999 | |
| EP | 0793838 | 3/2000 | ........... B61L/25/02 |
| EP | 1013533 | 6/2000 | ........... B60L/15/32 |

OTHER PUBLICATIONS

ISO/CD 11992, "Road Vehicles—Electrical Connections . . . ," ISO/TC22/SC3N803E (Mar. 1995), Part 1 (pp. 1–2) and Part 3 (pp. 1–2).

* cited by examiner

Primary Examiner—Daniel J. Wu
Assistant Examiner—Tai T. Nguyen
(74) Attorney, Agent, or Firm—Proskauer Rose LLP

(57) ABSTRACT

A method and apparatus for data exchange between a towing vehicle and an attached trailer uses radio contact via transmission/receiving modules contained in the towing vehicle and in the trailer. To recognize that the towing vehicle and the trailer are connected, the transmission/receiving module of the towing vehicle transmits an identification signal, and at the same time, changes the electrical status of a connection line between the towing vehicle and the trailer. If the transmission/receiving module located in the trailer recognizes the change in the electrical status of the connection line simultaneously with receiving the transmitted identification signal, the identification signal is stored within the trailer. In subsequent communications between the towing vehicle and the trailer, the identification signal is always transmitted before the message. As such, only the attached trailer, with the appropriate stored identification signal, can communicate with its towing vehicle. Moreover, the same technique can be used for multiple trailers attached to the same towing vehicle.

17 Claims, 1 Drawing Sheet

METHOD AND APPARATUS FOR DATA EXCHANGE BETWEEN TOWING VEHICLE AND TRAILER

BACKGROUND OF THE INVENTION

The present invention relates to a method and apparatus for the exchange of data between a towing vehicle and one or more trailers. More specifically, the present invention relates to utility vehicles, where the towing vehicle and the trailer(s) are electrically connected to each other.

One prior art method is disclosed in U.S. Pat. No. 5,142,278 (Moallemi, et al, dated Aug. 25, 1992), which is incorporated herein by reference. This patent describes a towing vehicle electrically connected with two trailers via an electrical supply line. To transmit data between the towing vehicle and the trailers, the trailers transmit a modulated identification signal on the power line coupling the towing vehicle and the trailers. Data may consist e.g., of identification signals of the trailers, as well as temperature and pressure values in the trailers. This data is available in the towing vehicle, and is transmitted via a radio link to a central office. The central office can thereby control the location of the vehicles, as well as additional data exchanges. There is no radio link between the towing vehicle and the trailers.

Furthermore, EP 0 793 838 B1, equivalent to U.S. Pat. No. 5,831,519 (Lohmann, et al, dated Nov. 3, 1998), which is incorporated herein by reference, discloses a traffic control system for transportation systems. This control system provides one data processing unit in the towing unit, and another in the towed unit. The two data processing units can exchange information by wireless transmission. This type of prior art system is used primarily for theft protection.

Finally, EP A1 1 013 533 (Graeber, dated Jun. 28, 2000), which is incorporated herein by reference, discloses a process for the determination of the physical sequence of connected train vehicles, and an arrangement to carry out the process (train baptism). In this case, information is transmitted from radio systems built into the vehicles, when called for by a train master, via a radio-based data communication system connected to the train. To identify the vehicles common to a train, a coded identification signal is transmitted to the vehicles via the main air line, and the vehicle radio devices confirm the signal during determination of the sequence.

For a road utility vehicle, it is particularly desirable to exchange data and commands among the electronic braking systems (EBS) in the motor vehicle and in the trailers. This type of data communication has a positive effect upon the braking behavior and stability of the vehicle train.

While trailer and motor vehicle EBS are generally designed for stand-alone operation, cooperation between the two systems is desirable. As such, a vehicle movement dynamics (VMD) control contained in the EBS can exchange data between the trailer and the motor vehicle, and can e.g., brake individual wheels of the trailer whenever necessary.

For this type of data exchange, i.e., via an electrical line, a standardized interface is defined in ISO 11992. This interface enables the exchange of data via an electrical connection line, designated as CAN bus. As such, a matching identification for towing vehicle and corresponding trailer is not necessary. In practice, however, the above-mentioned interface is not in common use, and can not be assumed to be present. Moreover, an alternative connection line of the EBS itself by means of a data cable would not be a practicable method.

It can be assumed that future data transmissions between a towing vehicle and one or several trailers will be implemented via a radio connection. As such, the towing vehicle and the trailer(s) would each contain a two-way transmitting/receiving module for data exchange. A short range (less than 100 m) would be sufficient for such a radio connection. Further, the radio transmission must be confined to the towing vehicle and its connected trailers, so as not to interfere with any other trailers or towing vehicles located nearby.

It is therefore an object of the present invention to enable the reliable identification of a towing vehicle and its connected trailer(s) when communicating by radio transmission. As a result, a radio message will be recognized and carried out only by the appertaining, interconnected towing vehicle and trailer(s).

SUMMARY OF THE INVENTION

In accordance with an illustrative embodiment of the present invention, a method for the exchange of data between a towing vehicle and an attached trailer, which are connected electrically via a connection line and are equipped for transmitting and receiving radio signals, comprises the following steps:

a. upon starting up the towing vehicle, transmitting an identification signal from the towing vehicle, b. the towing vehicle also simultaneously modifying the status of the connection line, c. upon the trailer receiving the identification signal transmitted from the towing vehicle, and simultaneously recognizing the modified status of the connection circuit, the trailer then storing the identification signal, so that subsequent communication between the towing vehicle and the trailer is enabled by means of the identification signal.

The inventive design can also be used with multiple trailers attached to the towing vehicle, where all the trailers are similarly equipped.

In an alternative embodiment, the identification signal can be generated as a result of braking or directional signaling, in lieu of a start up signal.

In yet another embodiment, a predetermined number of simultaneous identification signals and connection circuit status changes are required for enabling communication between the towing vehicle and the trailer(s).

BRIEF DESCRIPTION OF THE DRAWING

The invention is described in greater detail below through the example of embodiments shown in the drawing, wherein.

DETAILED DESCRIPTION OF PREFERRED EMBODIMENTS OF THE INVENTION

Figure 1:
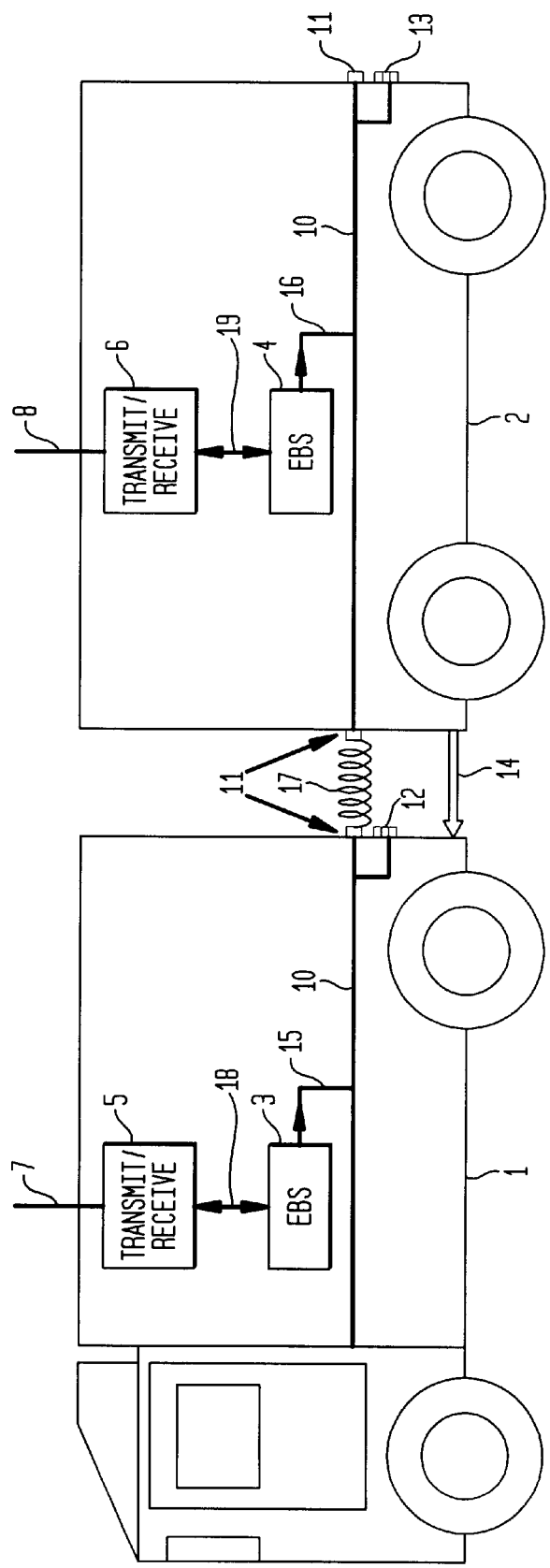
FIG. 1 depicts a towing vehicle and attached trailer, each having an electronic braking system and a transmission/receiving module, in accordance with the invention.

The present invention is illustrated in FIG. 1, where a towing vehicle 1 is hitched to a trailer 2 by means of a hitch 14. In the same manner, a similarly equipped number of trailers can be hitched to the towing vehicle 1.

An electrical connection line 10, configured as a multi-wire braking light/blinker cable, is connected between the towing vehicle 1 and the trailer 2. The connection line 10 extends between the individual vehicle units (1, 2) via sockets 11 and flexible cables 17. Braking light and blinker units 12, 13 are connected to the connection line 10.

Both the towing vehicle 1 and the trailer 2 are equipped with an electronic system, such as an electronic braking system (EBS) 3, 4. This type of electronic braking system is well known in the art, and serves to actuate the wheel brakes as a function of brake actuation by the driver, or as a function of other parameters. An ABS (anti-lock braking system), as well as an ASR (automatic slip regulation), are usually integrated in a known manner into the EBS electronics. Other types of electronic systems can also be used, such as a vehicle movement dynamics (VMD) control.

The electronic systems 3 and 4 are connected via circuits 15, 16 to the connection circuit 10.

In addition, a transmission/receiving module 5, 6 is provided in both the towing vehicle 1 and in the trailer 2. These modules 5, 6 are each provided with an antenna 7, 8. An electrical connection 18, 19 is provided for data exchange between the modules 5, 6 and their corresponding electronic systems 3, 4.

The electronic systems 3, 4 and the transmission/receiving modules 5, 6 are installed at any suitable location in the vehicles 1, 2, and are supplied with an appropriate operating voltage.

The inventive method for a two-way exchange of data between the towing vehicle 1 and the trailer 2 is described below, with respect to FIG. 1.

It is assumed that the towing vehicle 1 with attached trailer 2 is parked in a shipping yard. When a driver places the vehicle into operation by turning on the ignition, the electronic system 3 (or the module 5) transmits a momentary signal via line 15 to the connection line 10. This signal causes the existing voltage state on the connection line 10 to be switched, either from zero to operating voltage $u_B$, or from $u_B$ to zero. The signal, can be transmitted to the braking light line, or to the blinker line contained within the connection line 10, which would briefly modify the signal status of the braking light and/or the directional signal 12, 13. This modification is advantageously so brief, that it produces no flickering of the braking lights or blinkers.

Moreover, the above-mentioned momentary signal can also be transmitted to another connection line, such as a pneumatic line.

Simultaneously with the transmission of the momentary signal to the connection line 10, the EBS 3 causes the transmission/receiving module 5 of the towing vehicle 1 to transmit an identifying radio signal via its antenna 7 to the trailer 2. A characteristic feature of the transmitting electronic system 3, e.g., its serial number, can advantageously be used as the identification signal. Advantageously, the frequency used for locking the vehicle doors can be used as the transmission frequency of the transmission/receiving module 5, 6.

The electronics of the EBS 4 in the trailer 2 are capable of recognizing the above-described actuation/deactivation of the connection line 10 via line 16. This is achieved by means of suitably programming the micro-controller ($\mu C$) incorporated in the EBS 4. When the EBS 4 receives the above-mentioned identification radio signal transmission from the EBS 3, via the antenna 8 and the transmission/receiving module 6, coincident with the status change of the connection line 10, the identification signal is stored in either the EBS 4 or in the transmission/receiving module 6. As a result, the EBS 4, or the transmission/receiving module 6, will react only to those radio signals that are preceded by the above-mentioned identification signal. In similar fashion, the EBS 3, or the transmission/receiving module 5, can receive identification signal transmissions from the EBS 4 in the trailer 2.

Therefore, the above-described identification signal process enables only the interconnected vehicle elements 1, 2 to react to mutual radio signals.

Although other similarly equipped vehicles located nearby can also receive the same radio signals, no reaction takes place because the identification signal (e.g., the serial number of the towing vehicle electronic system) does not apply.

When the trailer 2 is unhitched from the towing vehicle 1, it is advantageous to cancel the identification signal stored in the transmission/receiving module 6 of the trailer 2. If the trailer 2 is later hitched to another towing vehicle, a new identification signal can be entered into its EBS 4, or into its transmission/receiving module 6.

In an alternative embodiment, the signal from the EBS 3 is not emitted simultaneously with its identification signal when the vehicle is started. Rather, the brake pedal or the directional signal is sensed, and at every actuation of the brake and/or the directional signal, a radio signal is transmitted, via the transmission/receiving module 5 and the antenna 7, together with the identification signal of the EBS 3. Only when the radio signal and the activation signal of the braking light or the directional signal on the connection line 10 are received simultaneously by the transmission/receiving module 6 of the trailer 2 is the identification signal stored in either the EBS 4 or the transmission/receiving module 6. In subsequent data exchanges, the transmission/receiving modules 5, 6 transmit their respective messages with a preceding identification signal. This ensures that only the connected vehicle elements 1, 2, and not other vehicles located nearby, will react to these messages.

While the first embodiment described above recognizes the identification signal at vehicle start-up, the alternative embodiment enables identification recognition after the vehicle has been started, at subsequent actuation(s) of the brake or directional blinker.

Moreover, the two processes can also be used in combination with each other.

The invention can be further refined such that the identification signal is stored only when a predetermined number of radio transmissions of the identification signal have been received, in synchronism with the switched status change of the connection line 10.

While the invention has been described by reference to specific embodiments, this was for purposes of illustration only and should not be construed to limit the scope of the invention. Numerous alternative embodiments will be apparent to those skilled in the art.

What is claimed is:

1. A method for the exchange of data between a towing vehicle and an attached trailer, wherein said towing vehicle and said trailer are connected electrically via a connection line, and wherein said towing vehicle and said trailer are equipped for transmitting and receiving radio signals, comprising the following steps:

a. upon starting up said towing vehicle, transmitting an identification signal from said towing vehicle, b. said towing vehicle also simultaneously modifying the status of said connection line, c. upon said trailer receiving said identification signal transmitted from said towing vehicle, and simultaneously recognizing said modified status of said connection line, said trailer then storing said identification signal, d. subsequently exchanging data between said towing vehicle and said trailer using said identification signal as an enabling code.

2. The method of claim 1 wherein said identification signal is based on a characteristic feature of said towing vehicle.

3. The method of claim 1 wherein said storing of said identification signal only takes place after the recognition of a plurality of identification signal transmissions and simultaneous modifications of said connection line.

4. The method of claim 1 wherein a plurality of trailers are electrically connected to said towing vehicle via at least one connection line.

5. A method for the exchange of data between a towing vehicle and a trailer, said towing vehicle having a brake and a directional signal blinker, wherein said towing vehicle and said trailer are connected electrically via a connection line, and wherein said towing vehicle and said trailer are equipped for transmitting and receiving radio signals, comprising the following steps:
   a. upon actuating either said brake or said directional signal blinker of said towing vehicle, transmitting an identification signal from said towing vehicle,
   b. said towing vehicle also simultaneously modifying the status of said connection line,
   c. said trailer receiving said identification signal transmitted from said towing vehicle, and simultaneously recognizing said modified status of said connection line, said trailer then storing said identification signal,
   d. subsequently exchanging data between said towing vehicle and said trailer using said identification signal as an enabling code.

6. The method of claim 5 wherein said actuation of either said brake or said directional signal blinker modifies said status of said connection line.

7. The method of claim 6 wherein said status modifications are momentary, such that there are no visible indications.

8. The method of claim 5 wherein said storing of said identification signal only takes place after the recognition of a plurality of identification signal transmissions and simultaneous modifications of said connection line.

9. Apparatus for exchanging data between a towing vehicle and an attached trailer, comprising:
   a. a first electronic control system located in said towing vehicle,
   b. a second electronic control system located in said trailer,
   c. a connection line which electrically connects said first and second control systems,
   d. a first transmission/receiving module located in said towing vehicle, for wireless communication,
   e. a second transmission/receiving module located in said trailer, for wireless communication,
wherein said first transmission/receiving module transmits an identification signal when said towing vehicle is started, and simultaneously, said first electronic control system modifies the electrical status of said connection line, and when said second electronic control system receives said identification signal via said second transmission/receiving module, and simultaneously recognizes said modified electrical status of said connection line, said second control system stores said identification signal, and subsequently recognizes only those transmitted messages which are preceded by said identification signal.

10. The apparatus of claim 9 wherein, after start up, two-way wireless communication between said towing vehicle and said trailer is enabled only when said identification signal precedes a message signal.

11. The apparatus of claim 10 wherein a frequency which is commonly used for locking doors on vehicles is used as a transmission frequency between said first and second transmission/receiving modules.

12. The apparatus of claim 10 wherein said identification signal stored in said second control system is canceled when said trailer is disconnected from said towing vehicle.

13. The apparatus of claim 12 wherein a serial number of said first electronic control system is used for said identification signal.

14. Apparatus for exchanging data between a towing vehicle, having a brake and a directional signal blinker, and an attached trailer, comprising:
   a. a first electronic control system located in said towing vehicle,
   b. a second electronic control system located in said trailer,
   c. a connection line which electrically connects said first and second control systems,
   d. a first transmission/receiving module located in said towing vehicle, for wireless communication,
   e. a second transmission/receiving module located in said trailer, for wireless communication,
wherein said first transmission/receiving module transmits an identification signal when either said brake or said directional signal blinker of said towing vehicle is actuated, and simultaneously, said first electronic control system modifies the electrical status of said connection line, and when said second electronic control system receives said identification signal via said second transmission/receiving module, and simultaneously recognizes said modified electrical status of said connection line, said second control system stores said identification signal, and subsequently recognizes only those transmitted messages which are preceded by said identification signal.

15. The apparatus of claim 14 further comprising a brake light line and a directional signal blinker line, wherein either said brake light line or said directional blinker line is said connection line.

16. The apparatus of claim 14 wherein, after actuation of either said brake or said directional signal blinker, two-way wireless communication between said towing vehicle and said trailer is enabled only when said identification signal precedes a message signal.

17. The apparatus of claim 14 wherein said storing of said identification signal only takes place after the recognition of a plurality of identification signal transmissions and simultaneous modifications of said connection line.

* * * * *